United States Patent [19]
Hopkins et al.

[11] 3,810,235
[45] May 7, 1974

[54] ADAPTIVE DATA READOUT TIMING ARRANGEMENT

[75] Inventors: John Warren Hopkins, Rahway; Ray Clifford Townley; Leonard Zimmerman, both of Middletown, all of N.J.

[73] Assignee: Bell Telephone Laboratories, Incorporated, Murray Hill, N.J.

[22] Filed: Mar. 23, 1973

[21] Appl. No.: 344,250

[52] U.S. Cl. .......................................... 340/174.1 B
[51] Int. Cl. .......................................... G11b 5/00
[58] Field of Search 340/174.1 B, 174.1 A, 174.1 H

[56] References Cited

UNITED STATES PATENTS

| | | | |
|---|---|---|---|
| 3,206,737 | 9/1967 | Lee et al. | 340/174.1 H |
| 3,509,531 | 4/1970 | Wilkinson | 340/174.1 H |
| 3,562,723 | 2/1971 | Behr et al. | 340/174.1 H |
| 3,623,041 | 11/1971 | MacDougell, Jr. | 340/174.1 H |
| 3,286,243 | 11/1966 | Floros | 340/174.1 H |

*Primary Examiner*—Vincent P. Canney
*Attorney, Agent, or Firm*—D. E. Snedeker

[57] ABSTRACT

Fixed and variable data bit position shifts in a memory system are compensated for by an adaptive readout strobe timing arrangement. One check bit transition per word is employed during readout to position the data bit stream relative to the recorded clock via an active shift register driven by an asynchronous external clock. The number of shift register cells through which each data word flows is determined digitally by a counter which measures the shift between the word check bit transition and a corresponding recorded clock bit.

16 Claims, 5 Drawing Figures

ADAPTIVE DATA READOUT TIMING ARRANGEMENT

BACKGROUND OF THE INVENTION

This invention relates to information storage systems, and more particularly to timing arrangements for timing the transfer of information to and from multichannel information storage mediums.

In information storage systems employing multichannel storage mediums, such as a magnetic disc or drum, it is conventional to associate individual transducers with each of the storage channels and to utilize one or more transducers associated with clock channels disposed on the storage medium to control the timing of the transfer of information to and from the storage medium. The clock channels generally provide an individual timing signal or clock pulse associated with each discrete storage location within the respective storage channels, such as for each bit storage location, and further often provide other timing signals associated with predetermined locations, such as the beginning of each word block or each sector in the respective storage channels.

It has been recognized that even though a bit of information is transferred to the storage medium and recorded in a storage location precisely synchronized with a particular clock pulse, the position of the corresponding readout signal with respect to that clock pulse can vary significantly so as to affect proper readout, particularly in a high density storage system. This record-to-readout timing variation, sometimes referred to as readout jitter or data shift, principally comprises logic delays due to the particular read-record circuitry and transducer delays due to variations between the individual transducers associated with the respective storage channels. The logic delay is the same for all of the storage channels in the system, assuming common read-record circuitry, and is constant except for a change due to the changing of a circuit or circuit component in the read-record circuitry. However, the delays due to transducer variations may differ from channel to channel in the system since each channel has associated therewith its own individual transducer. Further, additional timing problems arise randomly from time to time due to mechanical wear or jitter in the system, and due to temperature or speed fluctuations between the time the information is recorded and the time it is read out.

Heretofore, the problem has been eliminated in low density systems through the use of a self-clocking form of recording which does not require individual bit clock pulses for readout. In high density systems, on the other hand, the problem has been minimized by various timing arrangements for adjusting the positional relationship between the bit clock pulses and the data bit storage locations during readout. Most of the known adjustable timing arrangements employ a predetermined pattern of check bits recorded preceding each block or sector of data. In one such arrangement the successive check bits are detected and individually matched against a respective plurality of clock phases generated from the clock channel to select an optimum clock phase for data readout. In another known arrangement an external synchronous clock is phase-locked to the check bits and used for data readout. Another know solution to the problem employs a multitapped passive delay line, the clock bit pulses being delayed incrementally via the delay line until coincidence occurs with one of the check bits. Each of the known arrangements, though generally satisfactory, suffers from various disadvantages related to complexity, cost, storage space requirements, accuracy and integrability.

SUMMARY OF THE INVENTION

It is, therefore, a general object of this invention to provide a simple, compact and economical arrangement for adaptively compensating for record-to-readout timing variations in a multichannel information storage system, which arrangement alleviates the disadvantages of known timing arrangements.

More particularly, it is an object of this invention to provide an adaptive data readout timing arrangement which minimizes the storage required for timing adjustment purposes and which is susceptible of integrated circuit manufacturing techniques.

In accordance with our invention the above and other objects are attained in an illustrative embodiment of an adaptive data readout timing arrangement employing a single check bit transition per data unit or word during readout to position the data word bit stream relative to the recorded clock. Positioning is effected via an active shift register driven by an asynchronous external clock. The number of shift register stages through which each data word flows is determined by a counter which develops a digital representation of the timing relationship between the check bit transition and a corresponding recorded clock pulse.

According to one aspect of the present invention, the single check bit transition employed per data word may be recorded immediately preceding the data portion of the word or it may be an existing data bit transition within the data word. In either case, the storage space required for timing adjustment purposes is minimized and the need for check bit pattern detection circuitry is eliminated.

Further, timing compensation on a per word basis in the present invention, rather than on a per block or sector basis as in prior arrangements, advantageously permits the recording and readout of individual data words at times different from the recording of other data words within a given block or sector.

BRIEF DESCRIPTION OF THE DRAWING

The above and other objects and features of the present invention may be fully apprehended from the following detailed description when considered with reference to the accompanying drawing in which.

DETAILED DESCRIPTION

Figure 1:
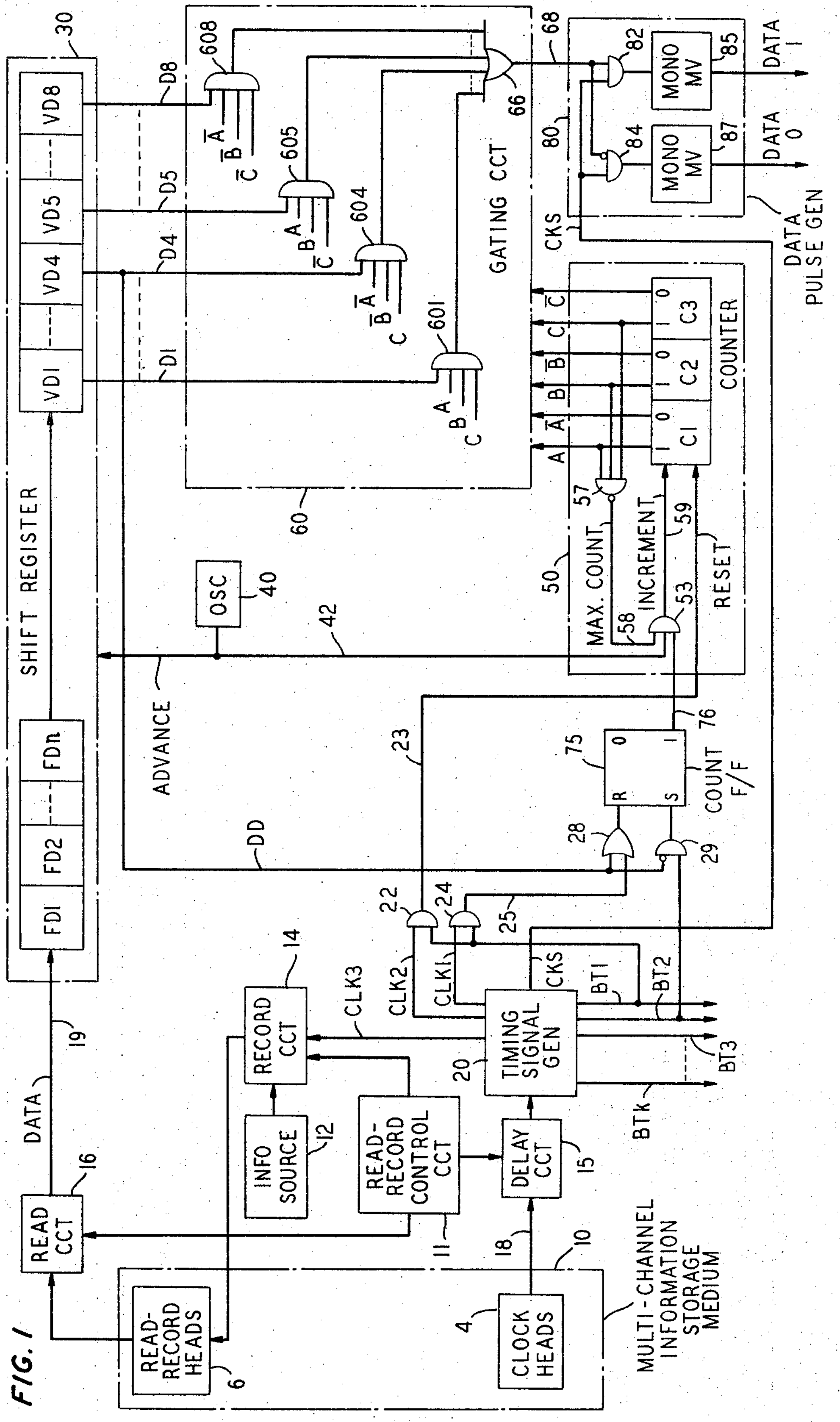
FIG. 1 shows an illustrative embodiment of an adaptive data readout timing arrangement in accordance with the principles of the invention.

The illustrative embodiment of the invention shown in FIG. 1 of the drawing is depicted in an information storage system for transferring information to and from respective information storage channels of multichannel information storage medium 10. Storage medium 10 may comprise, for example, an arrangement of one or more magnetic discs or magnetic drums, each having a plurality of concentric or parallel information storage channels. A plurality of transducers or read-record heads 6 associated with respective ones of the storage channels are individually selected in conventional manner for connection to read circuit 16 during readout operation and to record circuit 14 during recording operation.

Each of the information storage channels of storage medium 10 comprises a plurality of individual storage locations in which respective bits of information may be serially recorded. The bit storage locations in each storage channel are assumed to be arranged in data word blocks and in storage sectors as is well known in the art. For example, the storage channels may be arranged in a plurality of sequential storage sectors, the storage channels each containing a plurality of multibit data word locations within the individual storage sectors.

Figure 2A:
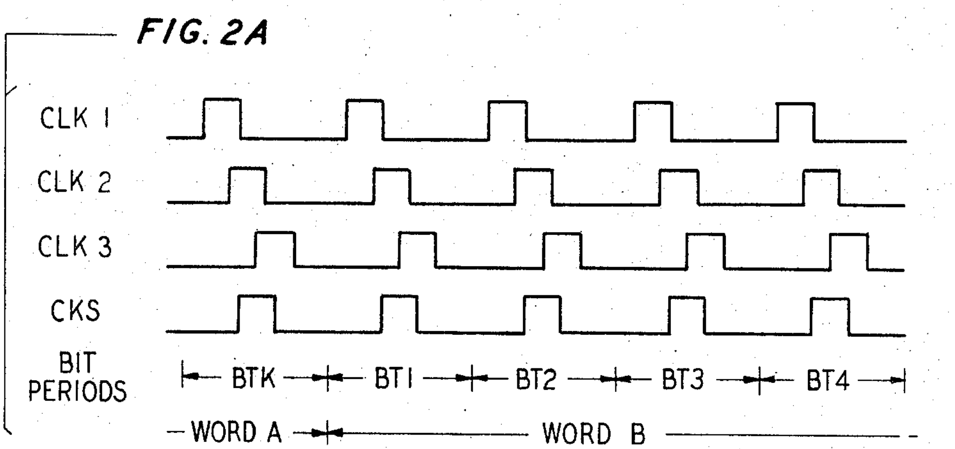
FIGS. 2A through 2D show various waveforms useful in describing the operation of the invention.

Timing for the transfer of information to and from the various data word locations is controlled by one or more clock channels disposed on storage medium 10 which, via clock heads 4, provide suitable clock pulses over lead 18 through delay circuit 15 to timing signal generator 20. Delay circuit 15 inserts a predetermined delay in the clock pulse path during data readout operation, as discussed below. Responsive to the recorded clock pulses read out on lead 18, timing signal generator 20 provides the various timing signals required by the system for data recording and readout and for other system operations. Specifically in FIG. 1, generator 20 provides an individual bit period timing signal on each of leads BT1-BTk corresponding to respectively-identified bit periods BT1-BTk of each k-bit word storage location in medium 10. During each bit period, generator 20 also provides clock pulse signals on leads CLK1, CLK2, CLK3 and CKS, as shown illustratively in FIG. 2A.

Figure 2B:
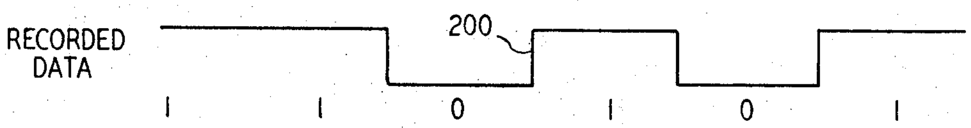

Information from source 12 is provided to record circuit 14, enabled by control circuit 11, for recording in particular locations in the individual storage channels of medium 10. Recording of the information may be accomplished in any of the known forms. However, it is assumed herein for the purposes of description that a non-return-to-zero form of recording is used wherein one polarity of magnetization represents a binary 1 and the other polarity represents a binary 0, a transition between magnetization polarities occurring only when the binary value of a bit changes from that of its immediate predecessor. During the recording of information, previously recorded clock pulses are provided on lead 18 to timing signal generator 20, as mentioned above, generator 20 extending appropriate clock pulse signals over lead CLK3 to record circuit 14. As depicted in FIG. 2B, the recording of information by record circuit 14 is thus effected in distinct bit storage locations on storage medium 10 in locations precisely defined by the respective clock pulse signals provided on lead CLK3. During recording operations, delay circuit 15 is effectively switched out of the clock pulse path to timing generator 20 under control of circuit 11.

During readout of the recorded information, the readout data signals on lead 19 must be sampled or strobed under the control of respective bit clock pulses on lead 18 to determine the polarity of magnetization in the individual data bit locations. For example, clock pulse signals provided on lead CKS by generator 20 are employed in FIG. 1 to strobe the readout data signals. As mentioned above and depicted in FIG. 2C, even though a bit of information is recorded in a bit storage location precisely synchronized with a particular prerecorded clock pulse, the position of the corresponding data readout signal with respect to that clock pulse can vary significantly due to data shift.

In accordance with our invention a single check bit transition recorded as a part of each data word or storage sector, illustratively at the beginning of each word, is used during readout to accurately position the data word bit stream read out on lead 19 for strobing under the control of corresponding clock pulses read out on lead 18. Positioning of the data bit stream relative to the clock pulses is effected through shift register 30 driven by a high speed asynchronous external clock, such as oscillator 40 operating at several times the data bit readout rate. Shift register 30 illustratively comprises a plurality of fixed stages FD1–FDn and a plurality of gated stages VD1–VD8. Stages FD1–FDn advantageously provide a fixed delay corresponding to some minimum timing compensation for readout data shift, for example one-half bit period, which is always required in the particular system. Gated stages VD1–VD8 selectively provide additional increments of delay up to the maximum required by the particular system to compensate, along with the fixed delay of stages FD1–FDn, for the total data shift anticipated. Illustratively, eight stages of additional delay are shown in FIG. 1, stages VD1–VD8 each being connected to respective gates 601–608 in gating circuit 60.

Gates 601–608 are individually controlled by respective unique combinations of the outputs on leads $A\bar{A}$, $B\bar{B}$, $C\bar{C}$ of counter 50. Thus, the total number of stages of shift register 30 through which each data word propagates before being gated out via gating circuit 60, and thus the total corrective delay imparted to the readout data, is determined digitally by counter 50.

Counter 50 is also driven advantageously by oscillator 40 over lead 42, counter 50 being incremented by oscillator 40 through enabled gate 53 over lead 59. Gate 53 is normally enabled for incrementing counter 50 when count flip-flop 75 is in a set state, the setting of flip-flop 75 being effected by a predetermined bit clock pulse as described below. However, gate 53 is disabled by NAND gate 57 over lead 58 when the maximum count corresponding to the number of gated stages VD1–VD8 is reached by counter 50, thereby preventing recycling of counter 50 during a data word. Illustratively in FIG. 1, counter 50 includes three binary cells C1, C2 and C3, providing the maximum count of eight states over leads $A\bar{A}$, $B\bar{B}$ and $C\bar{C}$. The maximum count provided by counter 50 in a particular system depends, of course, upon the number of gated shift register stages to be controlled thereby.

As mentioned above, counter 50 determines the number of gated stages VD1–VD8 through which the data bit stream flows before being outputted on lead 68 for strobing. This determination is dependent upon an interval of time measured by the incrementing of counter 50, starting from the setting of flip-flop 75 by a predetermined bit clock pulse on lead BT2 and ending upon the resetting of flip-flop 75 by the check bit transition over lead DD. The greater the interval of time, the higher the count in counter 50, and thus the fewer of stages VD1–VD8 through which the data flows. In FIG. 1, lead DD is connected to an intermediate one of stages VD1–VD8 corresponding to the nominal delay for the particular system, illustratively stage VD4. Consequently, the operation of counter 50 can effectively add to or subtract from the nominal delay in accordance with the count obtained.

It may be noted that for the extreme situation where the data shift for a particular word exceeds the maximum contemplated for the system, counter 50 is incremented to its maximum count and held there for the duration of the particular word, recycling being prevented via the disabling of gate 58. At the other extreme where the data shift for a word is less than the minimum anticipated by the provision of fixed stages FD1–FDn, incrementing of counter 50 is not initiated since flip-flop 75 remains reset, the data signal on lead DD (illustratively a 1) preventing the setting of flip-flop 75 via gate 29.

Figure 2C:
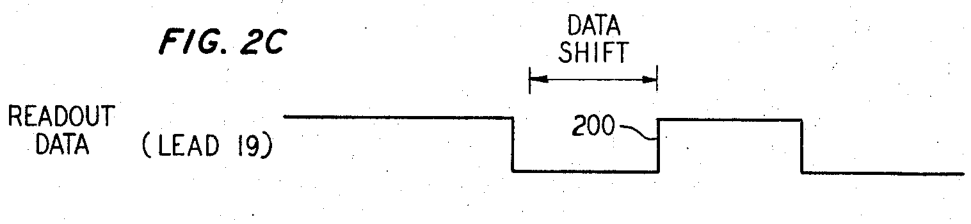
Figure 2D:
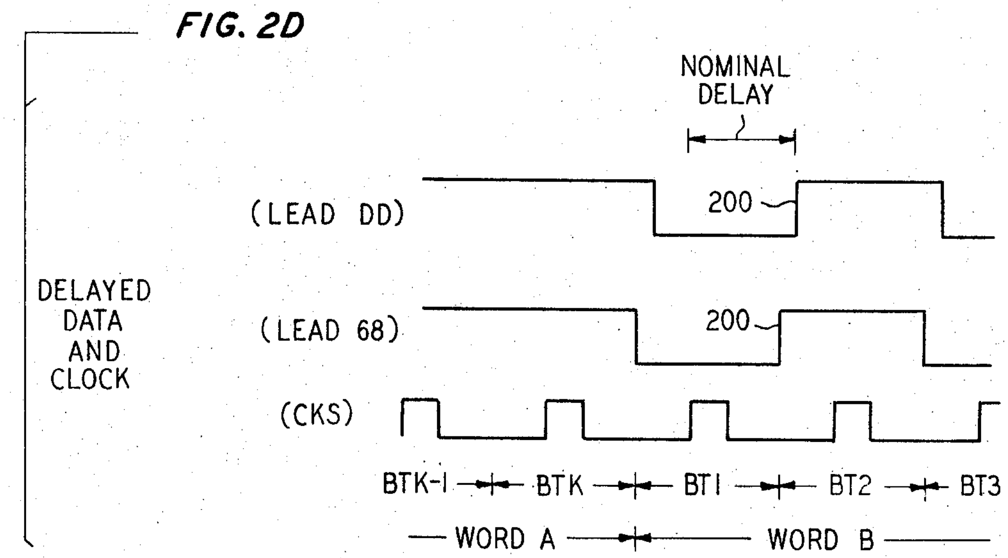

With the above description in mind, consider now the operation of the timing arrangement in FIG. 1 in adaptively compensating for the illustrative readout data shift depicted for word B in FIG. 2C. It will be recalled that the data is initially recorded using the bit clock pulse signals on lead CLK3, as depicted in FIG. 2B, and that it is desired during readout to accurately position the data for strobing by the clock pulse signals on lead CKS. It will be further recalled that during readout the clock pulses are delayed a predetermined interval, illustratively two bit periods, by delay circuit 15, as shown in FIG. 2D. The check bit transition 200 recorded during bit period BT2 is used for positioning the data bits of word B. Thus, as a clock pulse signal appears on lead CLK1 during first bit period BT1 of word B, gate 24 is enabled to extend a signal over lead 25 through OR gate 28, insuring that count flip-flop 75 is initially reset. A subsequent clock pulse signal on lead CLK2 during bit period BT1 enables gate 22 to extend a signal over lead 23, resetting the cells of counter 50. Count flip-flop 75 is then set at the leading edge of bit period BT2 via a signal over lead BT2 through gate 29 being enabled by the data signal on lead DD. The setting of flip-flop 75 enables gate 53 to initiate incrementing of counter 50 by oscillator 40.

Concurrently, the corresponding data bits of word B read out on lead 19 are advanced through the successive stages of shift register 30 by oscillator 40. Count flip-flop 75 remains set and incrementing of counter 50 continues until check bit transition 200 reaches shift register stage VD4. An output of stage VD4 extends transition 200 over lead DD through OR gate 28, resetting count flip-flop 75 to disable gate 53. Incrementing of counter 50 ceases and the count therein is reflected over leads $A\bar{A}$, $B\bar{B}$, $C\bar{C}$ to gating circuit 60.

At this point the bit transition 200 reaching stage VD4 and appearing on lead DD has been delayed a nominal amount, as depicted in the uppermost waveform in FIG. 2D, due to the illustrative one-half bit minimum delay of stages FD1–FDn and the additional delay (illustratively on the order of one-quarter bit period) of stages VD1–VD4. At the same time, counter 50 has determined any additional delay adjustments necessary to accurately position the data bit stream for strobing by the clock pulse signals on lead CKS. For the illustrative readout data shift depicted in FIG. 2C, counter 50 will be incremented from a count of zero to a count of three during the interval between the leading edge of bit period BT2 and the arrival of check bit transition 200 on lead DD. The corresponding output on leads A, B and $\bar{C}$ enables gate 605 in gating circuit 60, extending an output of shift register stage VD5 therethrough and through OR gate 66 to lead 68. Consequently, the data word bit stream advanced through shift register 30 over this path to lead 68 is adaptively delayed a total amount corresponding to the propagation delay through stages FD1–FDn and VD1–VD5, accurately positioning the data bits for strobing via the clock pulses on lead CKS as shown in FIG. 2D.

Of course, had the readout data shift in FIG. 2C been some lesser amount, such as between the minimum one-half bit period and the nominal three-quarter bit period, counter 50 would be incremented to a higher count, such as a count of six. The corresponding output on leads $\bar{A}$, B, and C of counter 50 would enable gate 602 (not shown) to output the data bit stream via shift register stage VD2 (not shown) to lead 68. A concomitantly lesser amount of delay is thus introduced in this instance for positioning the data bits for strobing by the clock pulse signals on lead CKS. This effectively provides a negative correction to the nominal delay provided at the output of stage VD4.

In any event, the actual strobing of the data bit stream to generate the output data pulses is effected in conventional manner, such as by data pulse generator 80. Therein, a dual stream of data pulse outputs is generated on leads DATA 1 and DATA 0 via monostable multivibrators 85 and 87, respectively, energized through gates 82 and 84. Gates 82 and 84 are enabled by the clock pulses on lead CKS and the respective data bit magnetization polarities on lead 68.

Upon completion of the readout of a data word, the timing arrangement in FIG. 1 is reset to its initial state preparatory for the next read or record operation. Specifically, flip-flop 75 and counter 50 are reset in the manner described above by the clock pulse signals on leads CLK1 and CLK2 during the first bit period of the next word.

The above description has illustratively assumed the use of a check bit transition recorded at the beginning of each word. Alternatively, in accordance with our invention, an existing data bit transition with the data word may be employed if desired in a particular application. For example, the first existing data bit transition within each word can be used for adaptively adjusting the readout timing in substantially the same manner as described above. For this purpose, counter 50 is reset at the end of each bit period and started anew in the next bit period until the first data bit transition appears during one of the succeeding bit periods. When the transition occurs and is extended over lead DD, counter 50 is stopped and the count therein retained for gating out the remainder of the word. At the end of the word, counter 50 is reset and the cycle initiated again for the next data word. Of course, unlike use of a check bit transition preceding the data word, the use of an existing data bit transition limits the range of adaptive timing compensation to one bit period, but this is more than adequate for most applications.

What has been described hereinabove is a method and arrangement for adaptively controlling the timing of the strobing of serial data read out from a multichannel storage medium so as to compensate for various timing variations with respect to individual units of data in the individual channels. Although the illustrative arrangement utilizes fixed and gated stages in shift register 30, it will be apparent that all stages thereof may be gated under control of counter 50. Further, it will be apparent that all or part of the fixed stages of delay in shift register 30 may be eliminated, if desired, along with a corresponding modification in the clock pulse readout delay provided by delay circuit 15.

It is to be understood, therefore, that the above-described arrangements are merely illustrative of the principles of the present invention. Numerous other arrangements may be devised by those skilled in the art without departing from the spirit and scope of the invention.

What is claimed is:

1. A method for adaptively controlling the timing of the strobing of serial data signals read out of a recording system using prerecorded strobing signals and using a single predetermined signal recorded with said data signals, comprising the steps of:

1. delaying said data signals, including said predetermined signal, a nominal period of time;
2. delaying said strobing signals a fixed period of time;
3. determining a digital representation of the timing relationship between said delayed predetermined signal and said delayed strobing signals; and
4. adjusting said data signal delay provided by step (1) in accordance with said digital representation determined in step (3).

2. A method according to claim 1 using a single predetermined signal recorded with each unit of data signals, further comprising the step of repeating steps (1) through (4) for each unit of said data signals and read out of said recording system.

3. A method according to claim 2 wherein said predetermined signal comprises a signal transition recorded preceding each unit of data signals.

4. A method according to claim 2 wherein said predetermined signal comprises a data signal transition recorded within each unit of data signals.

5. An adaptive data readout timing arrangement for an information recording system using prerecorded timing signals for processing serial data signals read out of the system, comprising:

a shift register having a plurality of serially connected stages, an independent source of pulses for advancing data signals read out of said system through successive ones of said shift register stages, means including a counter driven by said independent source adapted for deriving a digital representation of the timing relationship between said read out data signals and said prerecorded timing signals, and means controlled by said digital representation for determining the number of said shift register stages through which said read out data signals are advanced before being outputted for processing by said prerecorded timing signals.

6. A timing arrangement according to claim 5 wherein said deriving means is connected to a predetermined one of said second plurality of stages and includes logic means operative for connecting said independent source to said counter.

7. A timing arrangement according to claim 6 wherein said deriving means further includes means responsive to a predetermined prerecorded timing signal for operating said logic means until a predetermined data signal is advanced through said shift register to said predetermined one stage.

8. A timing arrangement according to claim 5 wherein said shift register comprises a first plurality of stages followed by a second plurality of stages, and wherein said determining means includes individual output gating means connected to each of said second plurality of stages and to said counter, each of said output gating means being individually operated by a respective unique digital state of said counter.

9. A timing arrangement according to claim 5 wherein said determining means includes gating means individually connected to said counter and to at least two of said shift register stages.

10. A timing arrangement according to claim 9 wherein each of said gating means is responsive to a respective unique digital representation for outputting said read out data signals.

11. A timing arrangement according to claim 10 wherein said data signals read out of the system include a predetermined data signal transition, said deriving means further including means responsive to a first predetermined one of said timing signals for enabling said counter to be driven by said independent source, means responsive to said predetermined data signal transition for disabling said counter, and means responsive to a second predetermined one of said timing signals for resetting said counter.

12. A timing arrangement according to claim 11 wherein said deriving means further includes means responsive to a predetermined digital representation for disabling said counter, a selected one of said gating means being responsive to said predetermined digital representation for outputting said read out data signals.

13. In combination, a plurality of serially connected shift register stages, a data input terminal connected to a first one of said stages, a plurality of data output terminals individually connected to respective ones of said stages, a timing signal input terminal, a counter, an independent source of signals for advancing data signals at said data input terminal through successive ones of said shift register stages, means including said independent source of signals and said counter for determining a digital representation of the timing relationship between data signals at said data input terminal and timing signals at said timing signal input terminal, output means, and means responsive to said digital representation for connecting said output means to a selected one of said data output terminals in accordance with said digital representation.

14. The combination according to claim 13 wherein said determining means is connected to a fixed one of said data output terminals and further includes means responsive to a predetermined timing signal at said timing signal input terminal for operatively connecting said independent source of signals to said counter and means responsive to a subsequent predetermined data signal at said fixed one of said data output terminals for disconnecting said source from said counter.

15. The combination according to claim 14 wherein said determining means further includes means responsive to a predetermined digital representation for disconnecting said source from said counter.

16. The combination according to claim 14 wherein said determining means further includes means responsive to the appearance of said predetermined data signal at said fixed one of said data output terminals prior to the appearance of said predetermined timing signal at said timing signal input terminal for inhibiting the connection of said source to said counter.

* * * * *